United States Patent [19]

Bartha

[11] E Re. 29,950

[45] Reissued Apr. 3, 1979

[54] PUNCHING DEVICE WITH PUNCH RETAINER

[75] Inventor: Kenneth J. Bartha, East Amherst, N.Y.

[73] Assignee: Houdaille Industries, Inc., Fort Lauderdale, Fla.

[21] Appl. No.: 860,398

[22] Filed: Dec. 14, 1977

Related U.S. Patent Documents

Reissue of:

[64] Patent No.: 3,958,476
Issued: May 25, 1976
Appl. No.: 591,888
Filed: Jun. 30, 1975

[51] Int. Cl.[2] ..... B26F 1/06

[52] U.S. Cl. ..... 83/140; 83/143; 83/588; 83/698

[58] Field of Search ..... 83/140, 143, 588, 635, 83/698

[56] References Cited

U.S. PATENT DOCUMENTS 2,893,488 7/1959 Schott ..... 83/140

FOREIGN PATENT DOCUMENTS 647163 12/1950 United Kingdom ..... 83/140

*Primary Examiner*—J. M. Meister
*Attorney, Agent, or Firm*—Hill, Gross, Simpson, Van Santen, Steadman, Chiara & Simpson

[57] ABSTRACT

A punching device includes a fixed frame adapted to support punch means in alignment with a ram. An assembly of the punch, a guide and stripping sleeve and a stripping spring is removable as a unit, and such assembly includes means by which such assembly is retained together, especially during handling away from the frame of the punching device. To this end, the sleeve has a circumferential groove in which there is a radial aperture, and a retainer member is disposed in the groove and has a portion that projects radially through the radial aperture into an elongated recess in the punch body.

18 Claims, 4 Drawing Figures

Fig. 1
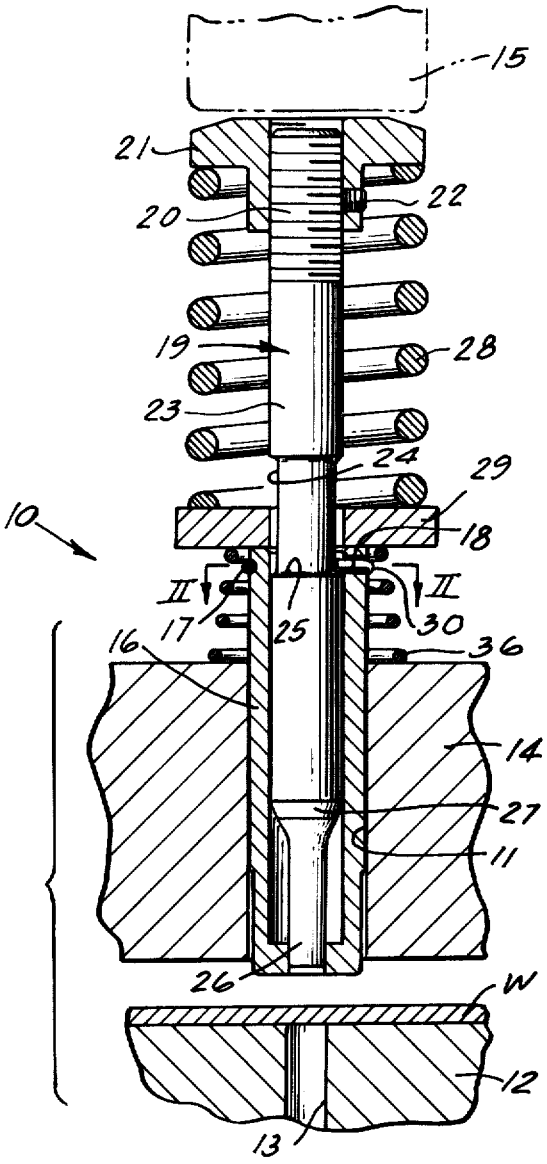
Fig. 3
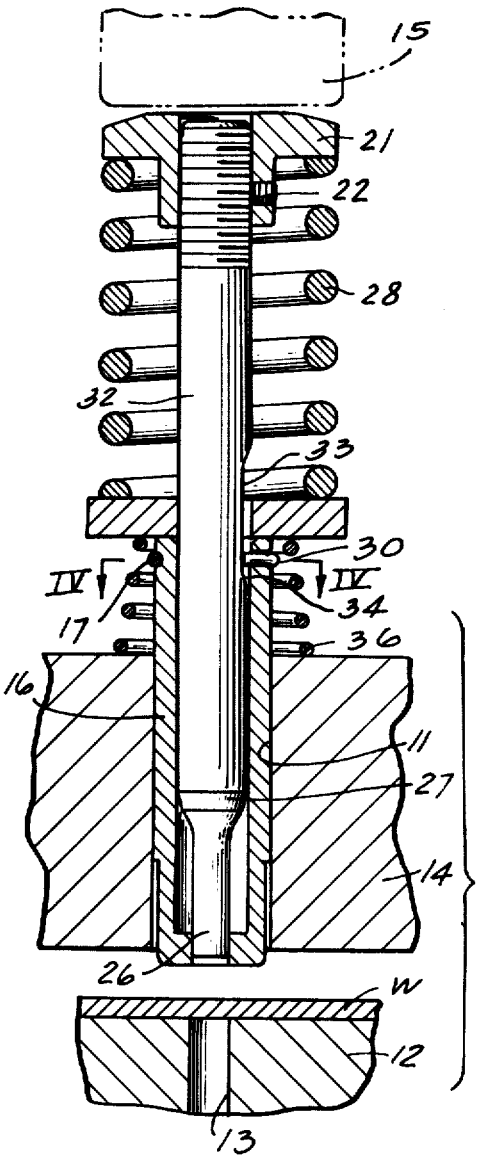
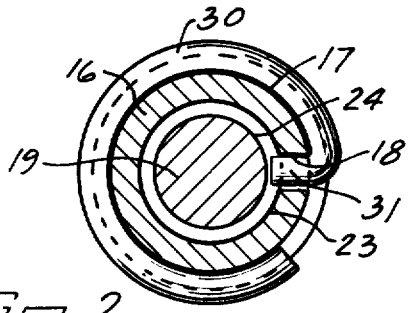
Fig. 2
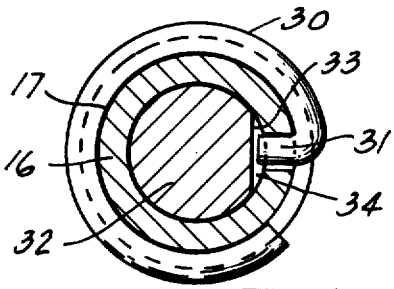
Fig. 4

PUNCHING DEVICE WITH PUNCH RETAINER

Matter enclosed in heavy brackets [ ] appears in the original patent but forms no part of this reissue specification; matter printed in italics indicates the additions made by reissue.

*This is a reissue application of U.S. Pat. 3,958,476 which issued on May 25, 1976.*

BACKGROUND OF THE INVENTION

1. Field of the Invention

This invention relates to a punching device for use in a punch press, press brake or the like.

2. Prior Art

Various types of frames or tool supports form a part of a punch press frame or are mounted thereon so that the tooling is in alignment with the ram of the press or so that it can be moved into alignment with the ram of the press. Such tooling is preferably removable manually without interference by any type of holding means, when the same is remote from the ram. One example of such a frame, mentioned to show the relationship of this invention thereto, is shown in U.S. Pat. No. 3,270,605 of which I am a co-inventor. In such a device, the upper arm of the frame is mounted to swing away from the punching axis, thereby bringing the tooling to a position where the same can be manually grasped and slid out of the frame for replacement. The tooling so removed includes a punch guide and stripper sleeve, a punch, and a stripping spring. With these components detached from the press, they can become disassembled with respect to each other. However, to utilize such tooling to full advantage, it is necessary that all components of the assembly stay together during such changing process. Prior hereto, it has been known to use a set screw to keep the guide sleeve loosely attached to the punch. Doing so required the provision of a collar as part of the guide sleeve to provide sufficient material which was tapped to accommodate the set screw.

SUMMARY OF THE INVENTION

According to the present invention, a punching device is provided wherein the guide and stripper sleeve has a circumferential groove in which there is a radial aperture, the punch having a body with an elongated recess that registers with the radial aperture, and there being a retainer member in the groove, the retainer member having a portion that projects radially through such radial aperture into the elongated recess, the recess being of such length as not to interfere with normal punching operations. Camming surfaces are provided on the punch to enable reception of the retainer portion in the punch recess and to enable the release thereof therefrom.

Accordingly, it is an object of the present invention to provide a punching device wherein the punch guide and stripper assembly have means by which the same are retained together for separate handling in connection with tooling changes.

Another object of the present invention is to provide means by which the parts of a punch guide and stripping sleeve assembly snap together for handling, and are similarly disassembled, without interfering with normal operation.

A further object of the present invention is to provide means by which a punch guide and stripping sleeve assembly is held together in a simple and inexpensive manner.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

ON THE DRAWING

FIG. 1 is a fragmentary cross-sectional view of a punching device in accordance with the present invention;

FIG. 2 is a cross-sectional view taken along line II—II of FIG. 1; and

FIG. 3 and FIG. 4 correspond to FIGS. 1 and 2, showing a modified form of the present invention.

AS SHOWN ON THE DRAWINGS

The principles of the present invention are particularly useful when embodied in a punching device such as shown fragmentarily in FIG. 1, generally indicated by the numeral 10. The punching device includes a frame that has a lower arm or portion 12 which has a die aperture 13 over which a workpiece W is disposed. The frame includes an upper arm 14 which could be the upper arm of a C-frame, and which typically is a swing-arm as shown and described in the patent cited above, by which the tooling is disposed in registration with a ram 15. Any tendency for the tooling to jump out of the upper arm during stripping is precluded by the presence of the ram 15, and therefore no structure needs to be provided for holding the assembly together during operation. However, during handling of the tooling remotely from the upper arm 14, retention means in accordance with the present invention is preferred.

The upper arm 14 has a bore 11 in which there is slidably disposed a punch and stripper assembly which can be lifted out as a unit from the upper arm 14. The punch and stripper assembly includes a punch guide and stripper sleeve 16 which has a circumferential groove 17, there being a radial aperture 18 through the sleeve 16 at the groove 17. The punch and stripper assembly further includes a punch 19, here shown to be of the two-piece type and to that end it includes a set of screw threads 20 at its upper end on which a punch head 21 is adjustably positioned and locked by a set screw 22. The punch 19 has a central body portion 23 in which there is provided an axially elongated recess 24 which is in registration with the radial aperture 18. In this embodiment, the recess 24 is an annular groove, the lower end of the groove 24 defining a cam surface 25 which slopes radially outwardly and downwardly. The punch 19 further includes a cutting end 26 of reduced diameter, there being a second camming surface 27 below the body portion 23, the camming surface 27 sloping radially inwardly and downwardly from the body portion 23. From the cutting portion 26, the camming surface can be said to be sloping upwardly and radially outwardly.

Also included in the punch and stripper assembly is a stripping spring 28 acting between the punch head 21 and the upper end of the sleeve 16, here through an annular washer 29. On expansion, the spring 28 urges the lower or cutting end 26 of the punch 19 into the stripping sleeve 16.

A lifting spring 36 acts between the upper surface of the upper arm 134 and the punch and stripping assembly, the washer 29 being in effect a part of the sleeve 16 so far as function is concerned.

A retainer member 30 best seen in FIG. 2 is disposed in the groove 17 and has an end portion 31 which projects radially through the aperture 18 into the recess 24 in the punch body 23 of the punch 19. In this embodiment, the retainer comprises a wire where the end portion 31 is a bent end thereof.

With this arrangement, the sleeve 16, and hence the punch and guide assembly is slidably removable from the bore 11 as a unit for replacement. When removed, the retainer 30 holds the removed parts together as an assembly for joint handling in connection with rapid manual tool changes.

When the punch and stripper assembly needs to be disassembled and reassembled, such as for sharpening, the retainer 30 is left in position on the stripping sleeve 16. Manual tugging will readily cause the cam surface 25 to act on the inner end of the retainer portion 31 to cam the same outwardly, thereby releasing the punch. After sharpening or on initial assembly, the cam surface 27 acts against the inner end of the retainer portion 31 to permit it to slide along the lower part of the body portion 23 and to snap into place in the punch recess 24. During subsequent operation, namely during punching, the inner end portion 31 of the retainer 30 does not engage either the upper or the lower ends of the recess 24. Sufficient clearance is provided so that on full expansion of the stripping spring 28, as drawn, the inner portion 31 of the retainer 30 will not engage the cam surface 25, and during stripping, the ram 15 will prevent any excessive relative movement. At the same time, the length of the recess 24 in an axial direction is adequate to insure that the inner end portion 31 is not engaged at the end of the working stroke by the portion that defines the upper end of the recess 24.

As shown in FIGS. 3 and 4, there is a modified form of the invention. This embodiment is identical in all respects except that a punch 32 is utilized which has its elongated recess formed as a flat surface 33 at one side of the body portion, there being a cam surface 34 corresponding to the cam surface 25 at the lower end thereof. In this embodiment, in order for the inner portion 31 of the retainer 30 to snap into the recess 33, the punch 32 must be correctly angularly oriented. Further, a camming disconnection can be achieved by rotating the punch 32 with respect to the sleeve 16 so that the flat surface of the recess 33 effects the camming action to release the retainer.

Thus, the embodiment of FIGS. 1 and 2 needs no relative angular orientation for assembly and can be assembled or disassembled only by relative axial movement, while the embodiment of FIGS. 3 and 4 requires angular orientation between the punch 32 and the sleeve 16, and this embodiment can have its retainer released by either relative axial movement or relative angular movement.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A punch device comprising:

a. a frame having a lower arm on which a die is supported, and an upper arm having a vertical bore aligned therewith;

b. a punch guide and stripper sleeve slidably disposed in the bore in said upper arm, there being a groove extending circumferentially in said sleeve, and a radial aperture through said sleeve at said groove;

c. a punch having a body slidably disposed in said sleeve, said body having an elongated recess in registration with said radial aperture;

d. a stripping spring acting between said sleeve and said punch to urge the lower end of said punch into said sleeve;

e. a lifting spring acting between said sleeve and said upper arm and urging said sleeve away from said die; and f. a retainer member disposed in said groove and having a portion projecting radially through said radial aperture into said elongated recess in said punch body.

2. A punching device according to claim 1 in which said elongated recess is provided by an annular groove extending about the periphery of said punch body.

3. A punching device according to claim 1 in which said elongated recess is defined by a flat surface at one side of said body portion.

4. A punching device according to claim 1 in which said sleeve has a head formed as a washer engaging the end of said sleeve, and engaged by and disposed between said stripping and said lifting springs.

5. A punching device according to claim 1 in which said retainer is a wire having a bent end which is said portion in said radial aperture.

6. A punching device according to claim 1 in which said sleeve is freely slidably removable from said frame, in an upward direction.

7. A punching device according to claim 1 in which the lower end of said recess is a cam surface.

8. A punching device according to claim 1 in which said punch has a cutting portion of smaller size than its body, there being an upwardly and outwardly sloping cam surface at the lower end of said body portion.

*9. A punch assembly for use with a cooperating die in a punching device comprising: a punch body having a cutting end portion and a head end portion with the cutting end portion slidably disposed in a stripper sleeve, the body having an axially elongated recess intermediate the ends received in the sleeve, the recess alignable with a radial aperture through the sleeve, the aperture open an exterior circumferentially extending groove in the sleeve, a washer surrounding the body intermediate the sleeve and the head end, a stripper spring surrounding the body intermediate the washer and the head end and acting therebetween to urge the cutting end into the sleeve, a retainer device received in the groove having a retainer portion in said aperture, means for resiliently biasing said retainer portion inwardly beyond an inner diameter of the sleeve and into said recess when the recess is aligned with the aperture, said means for resiliently biasing effective to retain the sleeve on the body by an interlocking action of the retainer portion and the recess, said means for resiliently biasing effective to allow the retainer portion to move radially outwardly in the aperture when the sleeve is pulled away from the head end with a force sufficient to overcome the bias when the retainer portion engages an axial bottom of the recess closest to the cutting end.*

*10. The assembly of claim 9 wherein the cutting end of the punch is of smaller size than remaining portions of the punch body, there being an upwardly and outwardly sloping cam surface at the lower end of said body portion effective to overcome the resilient biasing means to move the retainer portion radially outwardly in the aperture when the sleeve is slipped onto the cutting end portion of the body and forced axially thereof whereby the sleeve can be pushed onto the punch axially of the punch until the retainer portion indexes with the recess to retain the sleeve on the body.*

*11. The assembly of claim 10 wherein the recess has a downwardly and outwardly sloping cam surface at its axial bottom.*

*12. The assembly of claim 11 wherein the resilient biasing means includes a resilient portion of the retainer device, the resilient portion received in the groove.*

*13. A punch device comprising:*

*a. A frame having a lower arm on which a die is supported, and an upper arm having a vertical bore aligned therewith;*

*b. A punch guide and stripper sleeve slidably disposed in the bore in said upper arm, there being a groove extending circumferentially in said sleeve, and a radial aperture through said sleeve at said groove;*

*c. A punch having a body slidably disposed in said sleeve, said body having an elongated recess in registration with said radial aperture;*

*d. A stripping spring acting between said sleeve and said punch to urge the lower end of said punch into said sleeve;*

*e. A lifting spring acting between said sleeve and said upper arm and urging said sleeve away from said die;*

*f. A retainer device disposed in said groove and having a portion projecting radially through said radial aperture into said elongated recess in said punch body; and*

*g. means in said groove for resiliently urging said retainer portion inwardly into said elongated recess, said sleeve and said punch being capable of being manually pulled apart by a manual force sufficient to overcome said resilient bias, said retainer portion movable in said aperture whereby when said manual force is applied the retainer member portion will be forced outwardly in said radial aperture against the force of said means by engagement of said retainer member portion with a bottom of said recess, said recess having a diameter increasing bottom.*

*14. A punching device according to claim 13 wherein said elongated recess is provided by an annular groove extending about the periphery of said punch body, said bottom being at a diameter increase between said groove and a normal diameter portion of said body.*

*15. A punching device according to claim 13 wherein said elongated recess is defined by a flat surface at one side of said body portion, said bottom being defined at a diameter increase between said flat surface and a normal diameter portion of said body.*

*16. A device according to claim 15 wherein said bottom is a cam surface.*

*17. A device according to claim 14 wherein said bottom is a cam surface.*

*18. A device according to claim 13 wherein said punch has a cutting portion of smaller size than its body, there being an upwardly and outwardly sloping cam surface at the lower end of said body portion whereby said sleeve can be forced axially onto said punch by a manual force sufficient to overcome said resilient bias means whereby said upwardly and outwardly sloping cam surface will urge the retainer member portion radially outwardly in said aperture.*

* * * * *